(12) United States Patent
Hasinovic et al.

(10) Patent No.: US 7,393,401 B2
(45) Date of Patent: *Jul. 1, 2008

(54) SPRAY WAX COMPOSITION

(75) Inventors: Hida Hasinovic, Lexington, KY (US); Tara Weinmann, Lexington, KY (US)

(73) Assignee: Ashland Licensing and Intellectual Property, LLC, Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/640,483

(22) Filed: Dec. 15, 2006

(65) Prior Publication Data

US 2007/0163464 A1 Jul. 19, 2007

Related U.S. Application Data

(60) Provisional application No. 60/750,956, filed on Dec. 15, 2005.

(51) Int. Cl.
| | |
|---|---|
| C09D 191/06 | (2006.01) |
| C09D 183/00 | (2006.01) |
| C09G 1/02 | (2006.01) |
| C09G 1/08 | (2006.01) |
| C09G 1/12 | (2006.01) |
| C09K 3/00 | (2006.01) |
| C09K 3/18 | (2006.01) |
| C08L 91/06 | (2006.01) |

(52) U.S. Cl. ............................... 106/271; 106/2; 106/3; 106/10; 106/270; 106/272; 510/109; 510/180; 510/189; 510/244; 516/55; 516/77

(58) Field of Classification Search ...... 106/2, 106/3, 10, 270, 271, 272; 510/244, 275, 510/109, 180, 189; 516/55, 77
See application file for complete search history.

(56) References Cited

U.S. PATENT DOCUMENTS

| | | | |
|---|---|---|---|
| 2,780,554 A | | 2/1957 | Lerner |
| 5,217,758 A | * | 6/1993 | Greenleaf et al. ............ 427/387 |
| 5,326,387 A | * | 7/1994 | Faber et al. ..................... 106/3 |
| 5,462,587 A | * | 10/1995 | Greenleaf et al. .............. 106/2 |
| 5,520,843 A | * | 5/1996 | Wright ....................... 510/244 |
| 5,782,962 A | * | 7/1998 | Burke et al. .................... 106/2 |
| 5,925,341 A | * | 7/1999 | Cervantes et al. ........ 424/78.03 |
| 5,968,238 A | | 10/1999 | Healy et al. |
| 6,013,323 A | * | 1/2000 | Klayder et al. .............. 427/384 |
| 6,206,956 B1 | * | 3/2001 | Muntz et al. .................... 106/3 |
| 6,221,433 B1 | * | 4/2001 | Muntz et al. ................. 427/387 |
| 6,227,200 B1 | * | 5/2001 | Crump et al. .......... 128/207.16 |
| 6,342,556 B1 | * | 1/2002 | Batdorf et al. ............... 524/432 |
| 6,461,537 B1 | * | 10/2002 | Turcotte et al. .............. 252/194 |
| 6,494,767 B2 | * | 12/2002 | Fisher ......................... 451/28 |
| 6,579,923 B2 | | 6/2003 | Yarmey et al. |
| 6,607,717 B1 | * | 8/2003 | Johnson et al. .......... 424/70.12 |
| 6,645,307 B2 | | 11/2003 | Fox et al. |
| 6,685,765 B1 | * | 2/2004 | Ghodoussi ................... 106/10 |
| 6,858,284 B2 | | 2/2005 | Nun et al. |
| 6,933,268 B2 | * | 8/2005 | White ........................ 510/405 |
| 2005/0139120 A1 | | 6/2005 | Muller et al. |
| 2005/0155515 A1 | | 7/2005 | Jordan et al. |

* cited by examiner

*Primary Examiner*—Anthony J Green
(74) *Attorney, Agent, or Firm*—Carrithers Law Office PLLC; David W. Carrithers

(57) ABSTRACT

A water based spray wax composition containing a microemulsion of a cationic wax nanoparticles, a quaternary silicone compound and zinc oxide nanoparticles providing long lasting protection of paint, glass, and metal, plastic, rubber, or elastomeric trim surfaces. The use of microemulsions or nanometer sized particles in the primary ingredients provides a transparent spray wax composition, which provides excellent coverage due to a significantly larger surface area, due to the nanoparticles used in the formulation. It also enables the wax particles to penetrate and fill small cracks and crevices for improved appearance, and durability of the spray wax properties. Because of their small size, nanometer sized particles do not reflect light which passes though the coating without any, or a minimal, amount of reflection resulting in a visual appearance of the liquid being transparent and eliminating hazing, streaking, and swirl marks associated with conventional spray wax products utilizing ingredients composed of conventional sized particles.

56 Claims, 7 Drawing Sheets

FIG 1
FIG. 2
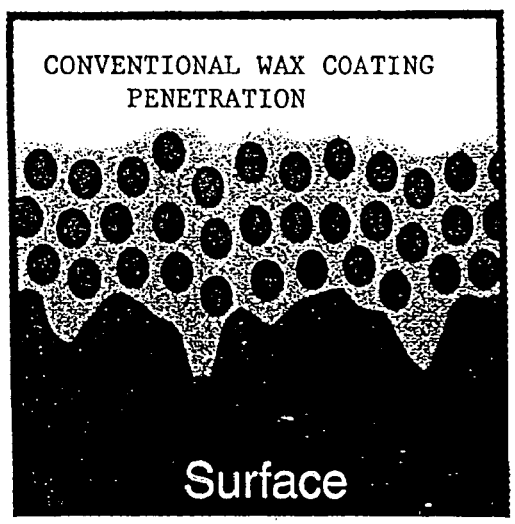
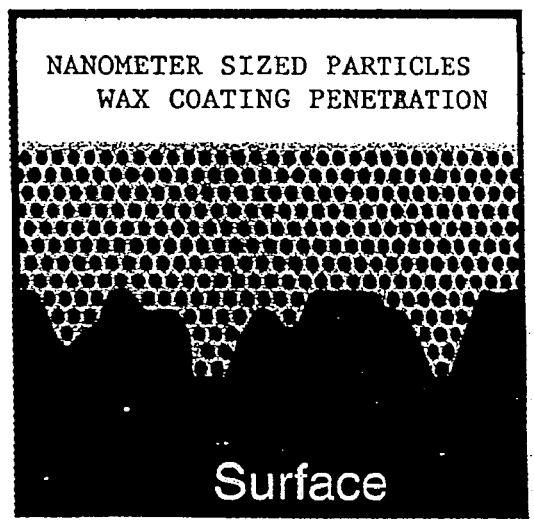

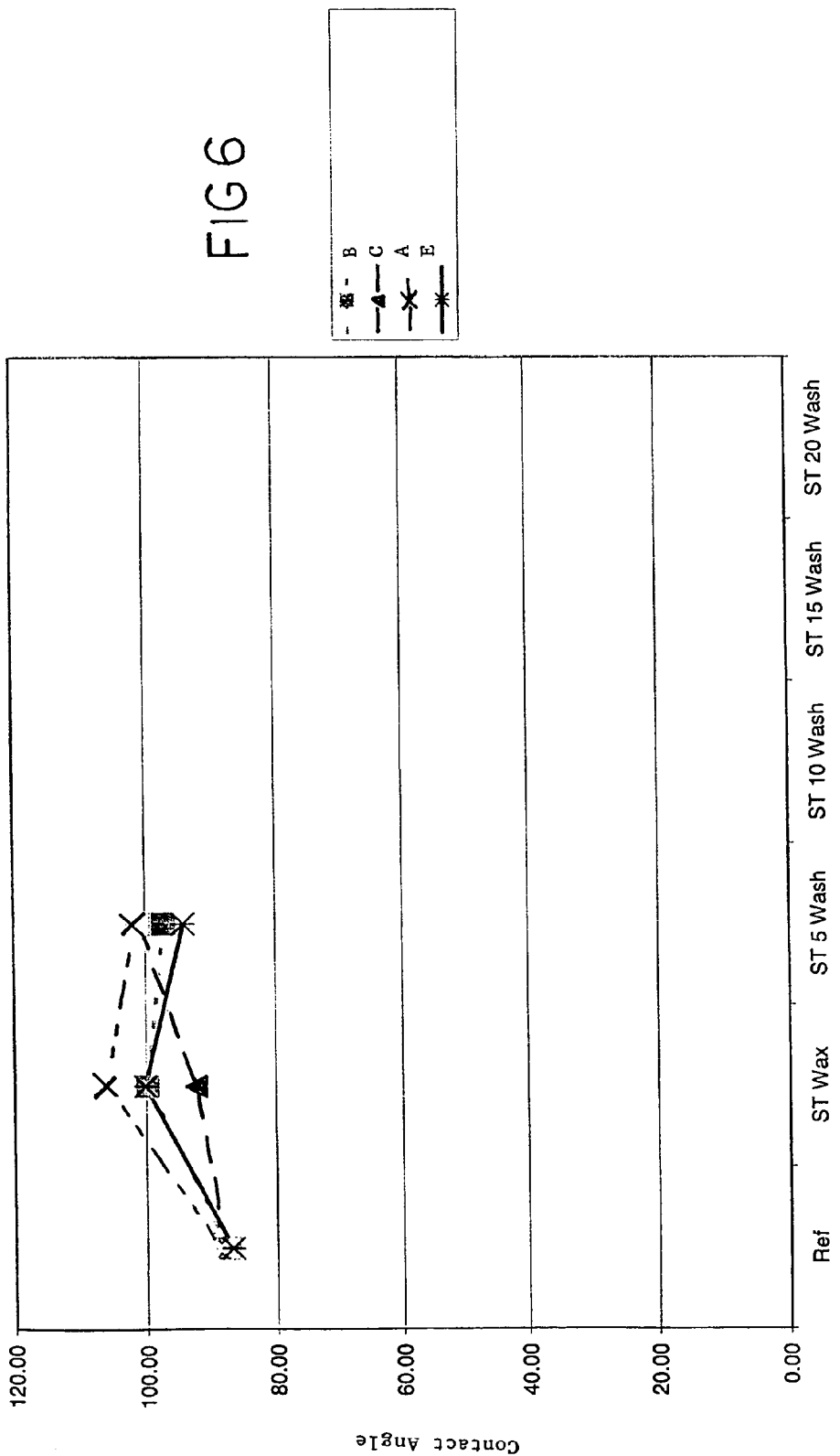

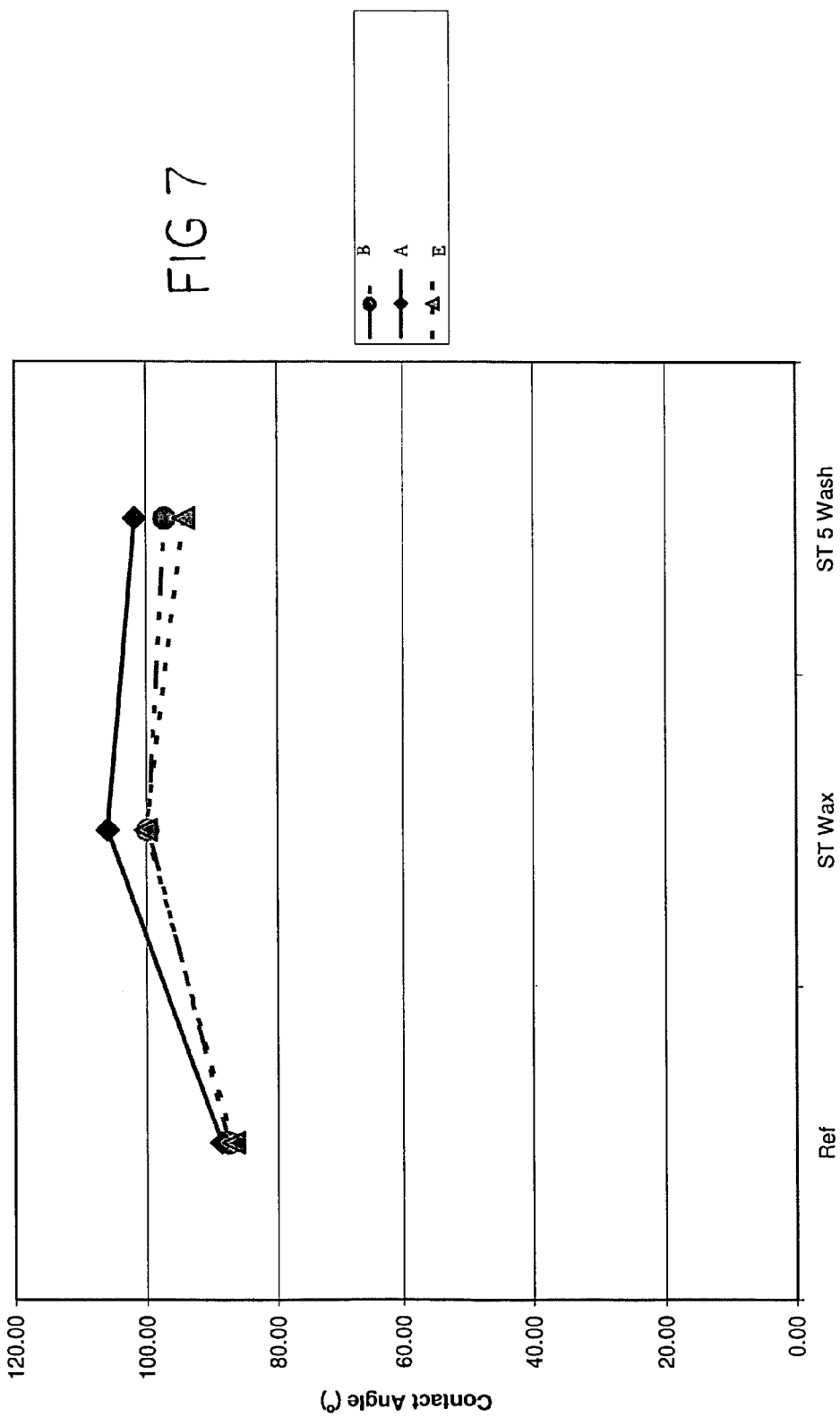

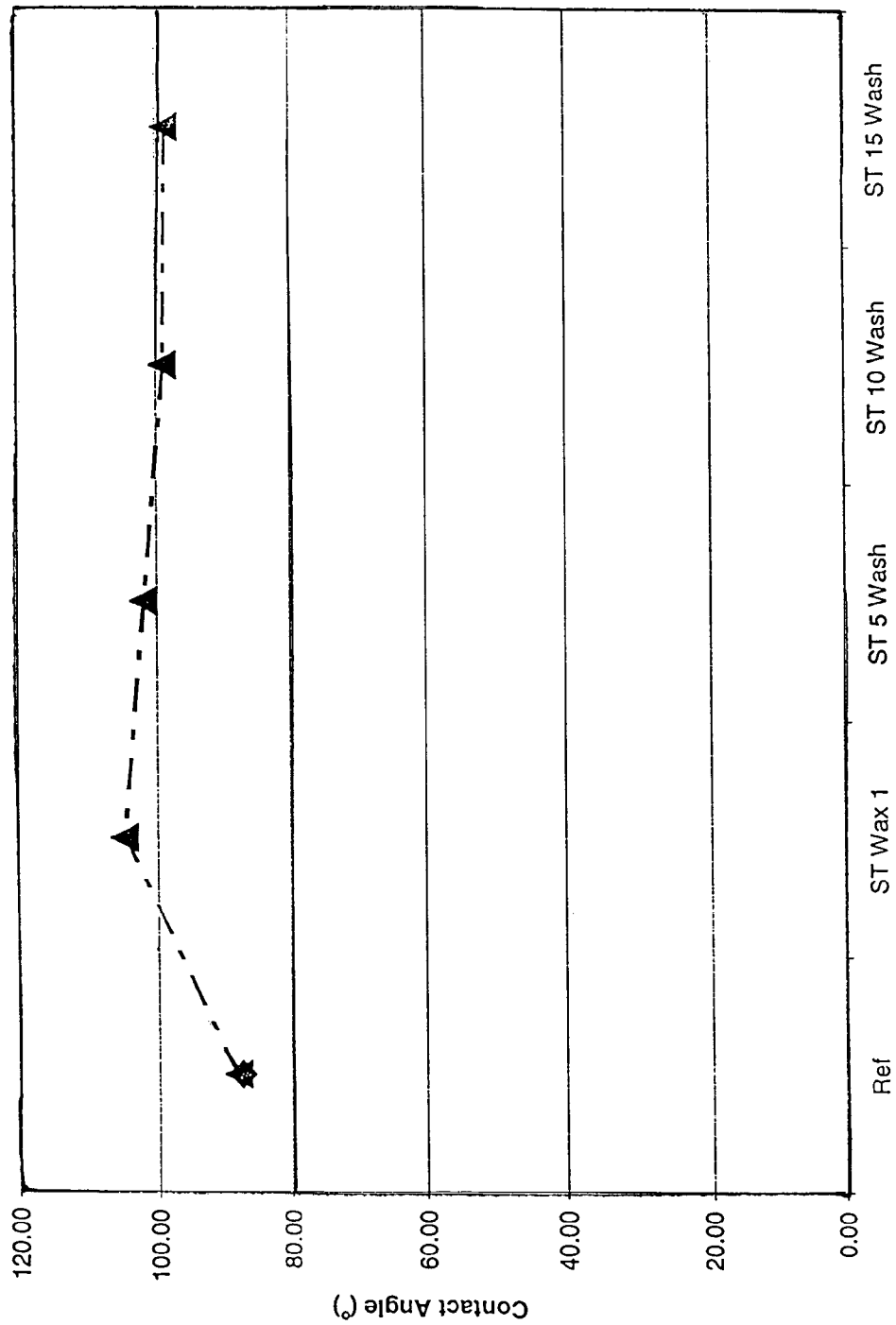

SPRAY WAX COMPOSITION

This application application claims priority from U.S. Provisional application Ser. No. 60/750,956 filed on Dec. 15, 2005 which is incorporated by reference herein.

TECHNICAL FIELD

This invention relates to a liquid spray wax composition developed using microemulsion technology for cleaning, protecting and enhancing the surface and appearance of paint, plastic, glass, metal, rubber, vinyl, and other synthetic materials

BACKGROUND OF THE INVENTION

Spray waxes are used for the exterior protection and enhancement of automobiles, boats, planes, trucks, and other vehicles. Exposure of these materials to heat and light, especially in extreme environmental conditions such as the interior of an automobile can degrade and damage the material over time resulting in discoloration and fading of the material. Spray wax products have been developed to coat the surface of these materials to minimize the degradation of the material due to environmental factors and provide a durable protection and shiny appearance. Problems occur when the products are sprayed onto a surface to be protected such as the trim on a car door or door handles and over spray results in a residue on the glass or plastic. Natural spray wax products typically utilize conventional wax emulsion products having a particle size typically around 2000 nanometers (0.2-100 □m) wherein hazing is observed during wax application and as a result uneven application. Alternatively, the product may be composed of a gel typically does not spray as easily in cold weather and may leave too thick of a coating on the surface resulting in streaking.

DESCRIPTION OF THE PRIOR ART

Compositions for protecting rubber, plastic, vinyl, and the like are known in the prior art. For instance, U.S. Pat. No. 5,782,962 by Burke et al. teaches a coating composition containing a fluorine containing polymer, micronized wax, hydrocarbon solvent, organosilicone compound, surfactant and water. U.S. Pat. No. 6,013,323 by Klayder et al. teaches a silicone gel wax for metal surfaces. U.S. Pat. No. 6,685,765 by Ghodoussi teaches a composition containing a wax, ultraviolet spray wax, and surfactant containing an anionic and cationic surfactant. U.S. Pat. No. 6,342,556 by Batdorf et al. utilizes submicronized zinc oxide together with an acrylic latex composition and viscosity control agent to maximize UV protection. U.S. Pat. No. 6,494,767 by Fisher teaches a composition containing micronized wax, organic solvent, emulsifier, silicone liquid in water. U.S. Pat. Nos. 5,217,758 and 5,462,587 by Greenleaf et al. teaches the use of a polysiloxane, diluent, and micronized wax composition. U.S. Pat. No. 6,221,433 teaches a organopolysiloxane based composition for elastomeric applications. U.S. Pat. No. 6,227,200 by LeGrow teaches a alkylaryl polysiloxane copolymer composition for protecting vinyl and rubber surfaces. U.S. Pat. No. 6,933,268 by White teaches the use of a composition containing a cleaning agent, silicone, thickener, neutralizing agent, ultraviolet agent, and water. U.S. Pat. No. 5,520,843 by Wright teaches the use of a water based emulsion of acrylic copolymer containing polyethoxylated alkylphenol and ammonium hydroxide. U.S. Pat. No. 6,206,956 by Muntz et al. teaches a organopolysiloxane emulsion based composition for protecting elastomeric surfaces. U.S. Pat. No. 5,326,387 by Faber et al. teaches the use of a volatile silicone fluid, an amino-functional silicone fluid, and an organopolysiloxane fluid to protect rubber, vinyl, and leather surfaces.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 1 is a drawing depicting a conventional spray wax coating applied to a painted surface;

FIG. 2 is a drawing depicting a the nano sized particles of the instant invention penetrating into small crevices and cracks providing a smoother surface;

FIG. 6 is a graph showing a Comparison of Water Droplet Contact Angle on Panels Treated with the composition of the present invention and competitor products.

FIG. 7 is a graph showing a Comparison of Water droplet contact Angle on Panels Treated with the composition of the present invention and competitor products.

FIG. 8 is a graph showing a Comparison of Water Droplet Contact Angle on Panels Treated with the composition of the present invention.

SUMMARY OF THE INVENTION

Figure 3:
FIG. 3 shows a scanning electron microscope microphotograph of a regular zinc oxide particle.

The present invention provides a water based spray wax cleaning and protecting composition containing a cationic microemulsion of a natural wax, (carnauba wax), having particles sized from 10 to 50 nanometers and nanoparticles of a quaternary silicone compound and Nanoparticles of a zinc oxide providing long lasting protection for painted, metal, wood, glass, plastic, rubber, and/or elastomeric surfaces.

One preferred embodiment of the instant spray wax composition comprises zinc oxide having a mean particle size of 60 nanometers or less in an amount of from 0.001 to 3.0 percent by weight of the total composition; a silicone quat in an amount of from 0.1 to 25 percent by weight of the total composition; a microemulsion of a cationic carnauba wax containing from 12 to 15 percent solids in an amount of 0.1 to 20 percent by weight of the total composition; and water in an amount from 75-95 percent by weight of the total composition.

More specifically a preferred embodiment of the instant spray wax composition consists essentially of a zinc oxide having a mean particle size of 60 nanometers or less in an amount of from 0.001 to 3.0 percent by weight of the total composition; a silicone quat in an amount of from 0.1 to 25 percent by weight of the total composition; a microemulsion of a cationic carnauba wax containing from 12 to 15 percent solids in an amount of 0.1 to 20 percent by weight of the total composition; and water in an amount from 75-95 percent by weight of the total composition.

The use of a microemulsions or nanometer sized particles in the primary ingredients provide a transparent spray wax composition for streak free applications. Because of their small size the Nanoparticles of the ingredients does not reflect a significant amount of light if any. Since light passes through without reflecting off of the particles the visual appearance of the liquid is transparent and a streak free application of wax is possible.

The microemulsion spray wax composition enhances heat and cold applications extremes and enables the wax particles to penetrate and fill nanometer sized cracks and crevices for improved appearance, and provides the excellent durability of the spray wax. Unlike conventional wax, the present invention can be applied in the shade or direct sunlight without adverse effect. Because of their small size, nanometer sized particles do not reflect light which passes though the coating with a minimal amount of reflection, resulting in a visual appearance of the liquid and wax coating resulting from the application thereof being transparent and eliminating streaking associated with spray wax products utilizing ingredients composed of conventional sized particles. It also enhances the color of painted surfaces resulting in a deeper more rich color and can be used on paint, glass, and plastic trim for protection and rain repellency. A color enhancement on the painted surface was observed and was especially obvious on dark colored vehicles.

The present spray wax composition utilizes nano technology in a liquid wax. Unlike conventional spray wax that use large particles of wax to provide a coating over irregular surfaces, the present invention uses nanometer sized particles of wax, a silicone quat, and UV protection compounds to penetrate surfaces and fill small cracks, crevices and irregularities with nanoparticles for optimal cleaning, conditioning, and UV protection. Nanometer sized UV particles provide better resistance to sunlight due to a significantly larger surface area than spray wax utilizing conventional larger micron sized particles based on a same weight comparison.

Accordingly, the instant invention provides a liquid spray wax composition composed of nanometer sized cationic carnauba wax particles and zinc oxide nanometer sized particles in combination with a silicone quat. The spray wax composition of the present invention cleans, protects preserves and enhances the appearances of painted, glass, metal, wood, plastic, rubber, or elastomeric surfaces. The product is easy to apply to both smooth and textured surfaces and has a transparent appearance. Utilization of nano technology to select components having nano sized particles provides a uniform deposition of the product leaving a thin film having exceptional protection properties. Unlike conventional spray waxes, the invention of the instant composition dries quickly and leaves no white residue behind. Moreover, because of its transparency, it does not leave an opaque or chalky residue if applied to glass and can be used on the windshield for rain repellency as well as providing an excellent transparent film for treating and protecting light lenses for headlights and tail lights and the like formed of glass or plastic without streaking. Moreover, the instant spray wax composition will not leave behind any powder residue due to the nanometer sized wax particles in the formula on moldings or seams of a vehicle. The instant invention will not even streak with overuse, or when used at extremely low or high temperatures.

The spray wax composition of the present invention can be used to provide protection on painted surfaces, glass, plastic and metal trim, rubber and elastomeric surfaces and to clean and protect metal wheels (aluminum, steel, billet, and chrome), or plastic wheel surfaces without scratching and providing additional repellency benefits against water and dust.

One preferred embodiment utilizes a composition containing nanometer zinc oxide particles, a cationic microemulsion of carnauba wax particles, a silicone quat, and water. A fragrance or colorant may be added as an optional ingredient. More particularly, an example of a preferred embodiment utilizes the following ingredients based on the weight of the total composition: water in an amount of about 75 to 95 percent deionized water, zinc oxide having a particle size of less than 200 nanometers and preferably about 60 nanometers in an amount of about 0.02 percent by weight, a silicone quat having in an amount of about 5 percent by weight, and a microemulsion of a cationic carnauba wax having a particle size of from about 10 to 50 nanometers in an amount of about 10 percent by weight. The composition may as an option also contain about 0.05 percent by weight of a fragrance and/or perservative.

The instant invention incorporates many improvements over conventional spray wax compositions. Because of the small size of the particles comprising the composition, the particles do no reflect light. The spray wax composition deposits rapidly on painted surfaces, metal, wood, glass, plastic, rubber, glass, or elastomeric substrate while providing excellent gloss and protection. The spray wax composition also provides gloss enhancement while providing a quick drying time and antistatic properties. The instant invention is formulated to provide a deep satin finish appearance. The present invention provides a spray wax composition utilizing a zinc oxide composition having a majority of the particles being nanometer sized particles of an average particles size of 20-30 nanometers to provide UV protection. The present invention utilizes nanoparticles of carnauba wax in order to increase the cold and hot temperatures ranges in which the product can be applied to the surface substrate. The present invention provides a spray wax composition which dries quickly as a clear film and leaves no oily residue behind. The present invention provides a spray wax composition wherein upon application the product has a transparent appearance. The present invention utilizes a natural wax having a cationic charged microemulsion as a delivery system to work in synergy with a cationic silicone quat in that the substrate surface typically has a negative charged surface and as the silicone quat molecules unfold and spread out, they are providing a smooth surface for adherence of the nanometer sized wax particles. Conventional waxes using particles too large to effectively fill fine scratches leave a surface that reflects light unevenly and compromises the shine. The instant invention uses nanometer sized wax particles to deeply penetrate the surface to fill fine scratches and enhance color, shine, protection, and ease of use without streaking or leaving a white residue. The present invention provides a spray wax composition for use on painted, metal, wood, plastic, rubber, glass, or elastomeric substrate surfaces of vehicles and on other items. The spray wax composition provides a rapid deposition of a uniform and thin film on the substrates providing excellent gloss and superior beading due to the synergy of the cationic charged wax and silicone quat compound. Moreover, the use of the silicone quat enhances the color of the treated surface without streaking or leaving a white or chalky residue as typically occurs with conventional spray wax compositions, especially on matted or textured surfaces.

The spray wax provides some degree of restoration to bumper surfaces and absorbs into the substrate thoroughly drying quickly to the touch without leaving a sticky residue. It can be sprayed directly on the surface and wiped with a clean towel and is resistant to water.

Molecular level waxing spray wax composition of the present invention facilitates ionic exchanges. Positively charged dirt particles become entrained into the aqueous phase of mixture. Dirt is ionically repelled from the surface while the wax within the mixture attaches to the uncharged now clean surface. The cationic waxed surface then presents a polar coating. The charged waxed surface actually resists dirt by providing a barrier to the positively charged dirt particles. The polar coating stays on the waxed surface of an indefinite period. As long as the polar coating remains dirt is repelled.

It is an object of the present invention to provide a spray wax utilizing ingredients composed of nanometer sized particles to produce a spray wax having a low turbidity and high light transmittance resulting in a protective wax coating which is essentially transparent.

It is an object of the present invention to provide a spray wax which can be sprayed onto a surface and wipe dry to leave a long-lasting high gloss shine on metal, glass, or plastic trim without hazing, streaking, or leaving a white residue.

It is an object of the present invention to provide a spray wax whereby the wax can be sprayed on the vehicle surface and wiped dry without requiring a waiting time for the wax to haxe, with no buffing, and can be applied in the sun or shade.

Other features and advantages of the invention will be apparent from the following description of the preferred embodiments thereof, and from the claims.

DESCRIPTION OF THE PREFERRED EMBODIMENT

According to the present invention, there are provided compositions for cleaning, preserving, protecting painted, metal, wood, plastic, rubber, glass, or elastomeric products. The spray wax composition is easy to apply to both smooth and textured surfaces and has a transparent appearance. The product dries quickly and does not leave an oily residue. Utilization of nanotechnology to select components having nanosized particles provides a uniform deposition of the product leaving a thin film having exceptional protection properties. Unlike conventional spray waxes, the invention of the instant composition dries quickly and leaves no oily residue behind. Moreover, the formulation has a transparent appearance, it is thermodynamically stable, and it does not separate upon standing such as conventional spray waxes. It can be applied to smooth and textured surfaces with ease and resists running and dripping.

Wax

The wax product can comprise of a synthetic wax instead of, or in addition to, the natural waxes; however, the preferred embodiment utilizes a natural wax and more particularly a wax having a cationic charge whereby the wax provides a surface-active substance in which the active constituent is the positive ion.

The preferred wax component is carnauba wax, more particularly a cationic carnauba wax microemulsion containing nanometer sized wax particles of less than 200 nanometers, and more particularly nanometer sized wax particles of between 10 to 50 nanometers which results in a transparent film formed on the treated substrate. It is contemplated that alternate plant waxes such as candelilla, montan, and/or japan wax could be utilized in the present invention as alternate wax components, preferably in a cationic microemulsion. It is contemplated that synthetic waxes such as polyethylene wax, polypropylene wax, polyamide wax, and combinations thereof can also be utilized in the instant invention.

The instant invention preferably utilizes at least one natural wax such as carnauba wax. The wax is provided as a microemulsion, typically a cationic microemulsion consisting of about 12-15 percent by weight wax in a solution of 85-88%. For example, a cationic microemulsion of carnauba wax containing 12 to 15% carnauba wax solids is utilized in the present composition; Therefor, the examples discussed in the preferred embodiments are based on a microemulsion containing 12-15% solids. The water based microemulsion contains ethylene glycol as a co-emulsifier at about 20% by weight and at least aliphatic amine derivatives as an emulsifier, and is available from Tomah Products, Inc. under the tradename of EMULSION C-340.

Of course a cationic microemulsion of carnauba wax can be blended on site using an appropriate emulsifier and under a specific temperature range; however, it is more convenient to obtain the wax in the form of a microemulsion from commercial vendors. The wax microemulsion consisting of about 15% wax solids is added to the wax composition blend in an effective amount to form a thin film on a wetted surface upon buffing, whereby the amount of the emulsion ranges from 0.1 to 20.0 percent by weight, and more preferably in a range of from 5.0 to 15.0 percent by weight, and more preferably in a range of from between 8.0 to 12.0 percent by weight based on the total weight of the composition. One preferred embodiment uses 10 percent by weight of a cationic microemulsion containing 15% carnauba wax solids. The percent by weight is based on the amount of (15% wax microemulsion in the total composition) rather than the percent of the active ingredient (pure wax). For instance, use of a 15% microemulsion of carnauba wax in amount of 20.0 weight percent results in about 3% by weight of the carnauba wax in the final formulation as an active ingredient based on the weight of the total composition.

The cationic emulsifier and its positive charge is attracted to the negatively charged car surface which becomes slightly hydrophobic attracting the waxes and oils to the surface resulting in a sheeting action due to the quaternary cationic surfactant. The resulting wax formulation formulated with a cationic microemulsion results in a higher buffing resistance and higher durability.

Silicone Quat

Because of their positive charge, quaternary ammonium functional silicones, ("silicone quats"), are useful in treating materials and surfaces that are primarily negatively charged, such as in many textile and personal care applications. The quaternary ammonium functionality makes possible certain ionic interactions that are the basis of many useful properties. These include increased hydrophilic character, ability to act as a thickener, and improved ability to aid in the deposition of other materials such as coatings and conditioning agents.

The silicone quat gives gloss enhancement while providing a quick drying time and antistatic properties to the spray wax formulation. Furthermore, it provides excellent gloss, superior beading and sheeting action, it is soluble in oil and water, is compatible with cationic microemulsions and is synergistic with the cationic wax microemulsion of the present invention. It has antistatic effects, substantive surfaces, a low viscosity of from 150 to 500 at 25 C., and is stable at acidic pH. Unlike conventional polydimenthylsiloxanes, silicone quat molecules actually unfold to provide a leveling condition and smoother surface for adherence of the wax particles.

A preferred embodiment of the present invention utilizes a silicone quat such as is sold under the tradename of TEGO POLISH ADDITIVE Q70, available from Degussa having a pH range of from 7 to 9, viscosity from 150-500 cps @ 25° C., and a density @ 25° C. of from 0.950 to 0.970 g/ml. It is a quaternary blend containing 70 percent solids of a long silicone chain based-silicone quat having 70 percent active quaternary particles in solvents comprising at least in part 2-propanol, 1-butoxy. It has a pH of 8.5 and dynamic viscosity of 250 mPA·s at 25° C. as measured on a Brookfield viscometer. The silicone quat is provided by the supplier in solution of 80% solids.

The molecule appears as follows:

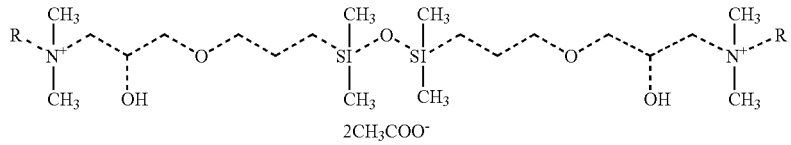

Another preferred silicone quat is available from the Dow Coming Corporation and comprises nanometer size silicone quat particles in a microemulsion such as sold under the tradename of DOW CORNING 5-7113 which is a silicone quat microemulsion comprising a 25% non-ionic emulsion of a cationized amino-functional silicone polymer. More particularly, the silicone quat in one preferred embodiment is silicone quaternium-16 and undeceth-11 and butyloctanol and undeceth-5. The microemulsion contains 25 percent by weight of silicone in a non-ionic emulsification in which water is a suitable diluent. In accordance with the MSDS sheet incorporated herein by reference, the silicone quat compound also contains about 60 percent water and from 14 to 40 percent of methylamino siloxane with glycidyl trimethylammonium chloride, from 7 to 13 percent of alkyl polyethylene glycol, and from 3.0 to 7.0 percent 2-butyloctanol. The microemulsion droplets contain silicone quat particles below 200 nanometers, wherein particles sizes below 20 nanometers appear as water clear and are transparent.

It is contemplated that other silicone quaternary compounds can be selected as suitable silicone quats used in the present invention such as those disclosed in U.S. Pat. No. 5,925,341 by Cervantes et al. issued on the 20 Jul. 1999, U.S. Pat. No. 6,607,717 by Johnson et al. which issued on the 19 Aug. 2003, and U.S. Pat. No. 6,461,537 which issued on the 8 Oct. 2002 all of which are incorporated herein by reference.

The amount of silicone quat in at least one preferred embodiment of the present invention is present in an effective amount of up to 25 percent by weight of the total composition. Preferred embodiments typically use an effective amount ranging from 0.1 to 25 percent by weight, and more preferably in a range of from to 0.5 to 20 percent by weight, and more preferably in a range of from between 1.0 to 15 percent by weight, and more preferably between 1.5 to 10 percent by weight based on the total weight of the composition. One preferred embodiment silicone quat in an amount of about 2.5 percent by weight based on the total weight of the composition.

UV Protection (Zinc Oxide)

A preferred embodiment of the present invention utilizes a micro fine transparent nanometer sized zinc oxide powder which offers exceptional and along lasting broad spectrum UV-B/UV-A protection. It is highly effective to protect transparent plastics and plastic films from harmful ultraviolet radiation. Its homogeneous small particles and narrow particle size distribution provides for excellent transparency. It is non-migratory and has antibacterial properties.

Regular commercially available zinc oxides have specific surface areas below 10 m2/gr, (typically 4-6 m2/gr), resulting in high primary particle sizes which results in white particle in appearance. The mean particle diameter of the zinc oxide is about 35 nanometers and the majority of the particles range from about 20 to 35 nanometers. One source of the nanometer sized zinc oxide, (ZANO 20) is Umicore Zinc Chemicals in Belguim. The preferred embodiment utilizes zinc oxide particles having a specific surface area of minimum 20 m2/gr, resulting in very fine loosely aggregated particles having a primary particle size below 60 nanometer providing a narrow particle size distribution allowing the zinc oxide to be used in transparent applications. Additional zinc oxide products available from Unicore Zinc Chemicals suitable for use in the present invention is sold under the tradename of ZANO LS and has a specific surface are of 20-30 m2/gr and a primary particle size (calculated) of about 35-55 nanometers; and ZANO HS which has a specific surface are of 30-40 m2/gr and a primary particle size (calculated) of about 25-35 nanometers.

Figure 4:
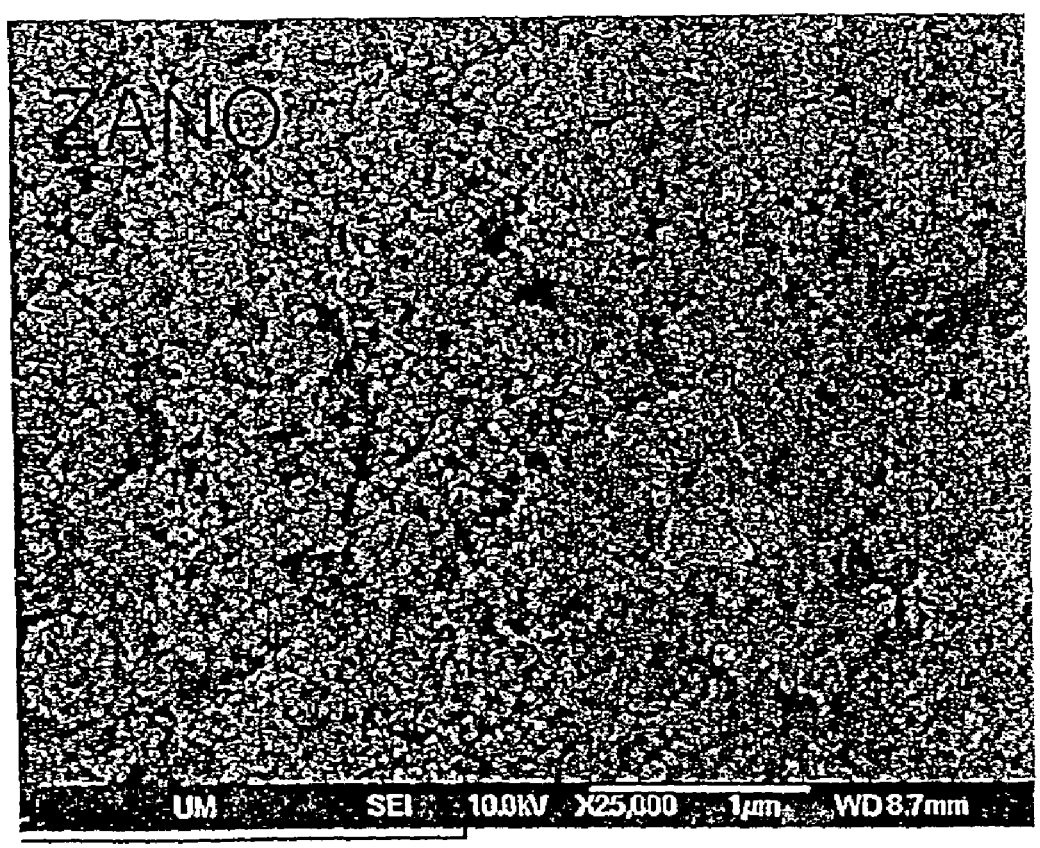
FIG. 4 is a scanning electron microscope microphotograph of a zinc oxide nanometer sized particle at a magnification of 25,000.
Figure 5:
FIG. 5 shows that the homogeneous particle size distribution of the nanometer sized particle and its fine primary particle size result in good transparency.

Moreover, as shown in the brochure from Umicore Zinc Chemicals and incorporated herein by reference are FIGS. 3 and 4 which show scanning electron microscope microphotographs of a regular zinc oxide particle compared to a zinc oxide nanometer sized particle at a magnification of 25,000. FIG. 5 shows that the homogeneous particle size distribution of the nanometer sized particle and its fine primary particle size result in good transparency. The nanometer sized zinc oxide particles are broad spectrum UV absorbers (UV-A and UV-B) which is not the case for micro fine TiO2 and organic UV absorbers. It also has anti-bacterial properties and is mildew resistant.

An alternate embodiment utilizes zinc oxide having an average particle size of 60 nanometers (calculated via SSA measurement) sold under the tradename of NANOGARD by Nanophase Technologies Corporation, in Romeoville, Ill. Although it is sold as a white powder, the nanometer sized particles in low concentrations utilized in the preferred embodiments of the instant invention appear transparent.

The zinc oxide in at least one preferred embodiment of the present invention is present in an effective amount of up to 1.0 percent by weight of the total composition and is believed to work in synergy with the cationic microemulsion of wax and of silicone quat. However, the more preferred embodiments of the invention utilizes an effective amount of zinc oxide ranging from 0.001 to 3.0 percent by weight, and more preferably in a range of from 0.005 to 1.0 percent by weight, and more preferably in a range of from between 0.01 to 1.0 percent by weight, and more preferably between 0.015 to 0.5% by weight based on the total weight of the composition. One preferred embodiment zinc oxide in an amount of about 0.02 percent by weight based on the total weight of the composition.

Preservatives

A biocide, such as SURCIDE P, SURCIDE G-50, DANTOGARD, (DMDM Hydantoin) or TROYSAN 395 is optionally used as a preservative in the product. The biocide is not a necessary component to provide a functional polish composition; however, the preservative provides a useful shelf life to the product.

A preferred preservative for Example 1 is SURCIDE G-50, in an effective amount of up to 1 percent of the total weight of the composition. Other preservatives such as polymethoxybicyclic oxazolidine may also be useful in the present invention.

A biocide such as 2-bromo-2-nitropropane-1,3-diol, a broad spectrum bactericide, can be used to control microbial growth in water containing products can be utilized in the instant spray wax formulation in amounts from 100 to 500 parts per million based on the final formulation volume, such as sold under the tradename of BIOBAN BP-PLUS by the Dow Chemical Company. The biocide is not a necessary component to provide a functional spray wax composition; however, the preservative provides a useful shelf life to the product.

The biocide preservative is added in an effective amount to preserve the wax composition product and ranges from 0.01 to 2.0 percent by weight, and more preferably in a range of from 0.05 to 1.0 percent by weight, and more preferably in a range of from between 0.1 and 0.5 percent by weight based on the total weight of the composition.

Fragrance

As an option the present spray wax composition utilizes a fragrance such as that sold under the tradename of FRENCH VANILLA FRAGRANCE available from Arylessence, Inc. in Marietta, Ga. Optionally other fragrances may be used and are also available from Arylessence, Inc. or other fragrance suppliers.

Although not required, an effective amount of one or more fragrances, such as vanilla, bubble gum, orange, fruity bouquet and the like may be added to the instant invention to impart a desirable scent to the product. Preferably the fragrance is present in an amount of up to 1 percent by weight, and more preferably of from between 0.001 to 1.0 percent by weight, and more preferably of from between 0.01 to 0.50 percent by weight. One preferred embodiment contains about 0.20 percent by weight based on the total weight percent of the composition.

Preparation

The composition is prepared by mixing the ingredients as follows wherein each ingredient is mixed well before adding the next ingredient. Add zinc oxide to the water and mix, adding and mixing the silicone quat, adding and mixing the microemulsion of wax, optionally adding and mixing the fragrance, and finally adding the biocide. The composition is a stable emulsion and does separate upon standing due to the incorporation of the Nanoparticles in suspension.

Application:

The spray wax product of the instant invention is applied by spraying the spray wax composition onto a dry painted, metal, wood, plastic, rubber, glass, or elastomeric surface and rubbing gently with a soft, clean microfiber cloth. No buffing is required and it is not necessary to allow time for the wax to haze. Furthermore, the spray wax can be applied in the direct sun or in shade, which is an advantage as compared to conventional waxes which leave haze and swirl marks if the wax is applied in the direct sun and dries quickly becoming hard. The instant invention also spreads evenly and easily without streaking. Moreover, it can be applied at low or high temperatures unlike conventional waxes.

EXAMPLES

Preferred formulas for the wax composition of the present invention is set forth in following examples:

Example 1

| Constituent | Commercial Name | Percent by Weight |
|---|---|---|
| Cationic carnauba wax microemulsion (15% solids microemulsion) (average particle size less than 10-50 nm) | TOMAH C-340 | 8.0 |
| DC 57 113 Silicone Quat Microemulsion | | 5.0 |
| DOWANOL EB | | 1.0 |
| Water Soft or Deionized | | 85.8 |
| Fragrance | | 0.2 |

Example 2

| Constituent | Commercial Name | Percent by Weight |
|---|---|---|
| Cationic carnauba wax microemulsion (15% solids microemulsion) (average particle size less than 10-50 nm) | TOMAH C-340 | 8.0 |
| Silicone Quat (Tego Polish Additive Q-70) | | 2.5 |
| Water Soft or Deionized | | 89.3 |
| Fragrance | | 0.2 |

The formulation provides rapid deposition of a uniform and thin film on the substrates such as paint, glass, and trim with excellent gloss and superior beading were achieved by using silicone quat.

Example 3

| Constiuent | Commercial Name | Percent by Weight |
|---|---|---|
| Cationic carnauba wax microemulsion (15% solids microemulsion) (Average particle size 10-50 nanometers) | TOMAH C-340 | 8.0 |
| Silicone Quat | (TEGO Polish Additive Q-70) | 2.5 |
| Zinc Oxide (average particle size 60 nanometers) | (ZANO 20) | 0.02 |
| Water Soft or Deionized | | 89.18 |
| Preservative | (BIOBAN BP-PLUS) | 0.1 |
| Fragrance | | 0.2 |

The resulting product specifications are as follows: 3.3-3.6 brix, solids content of from 3.3 to 3.6, specific gravity at 70° F. OF 0.988 to 1.001, and a pH of 4.5 to 5.5.

Turbidity (Transparency)

An important advantage of the present invention is its application to painted surfaces and even glass or clear plastic because of its transparency.

As set forth previously, by using nanometer sized particles and microemulsions containing nanometer sized particles in the major ingredients, the spray wax composition of the instant invention provides a transparent spray wax composition is clear and transparent which enhances heat and cold applications extremes and enables the wax particles to penetrate and fill small sized cracks and crevices for improved appearance, and durability of the spray wax properties. Because of their small size, nanometer sized particles do not reflect light which passes though the coating without no or a minimal amount of reflection resulting in a visual appearance of the liquid being transparent and eliminating hazing, streaking, and swirl marks associated with conventional spray wax products utilizing ingredients composed of conventional sized particles. Moreover the synergy of the silicone quat with the nanometer sized wax particles enhances the color of the treated surface resulting in a deeper richer color.

Turbidity was measured as a function of light transmittance by comparing three leading competitive wax products.

A Spectronic 20 D+ was used with a filter having a range of from 340 to 599 nanometers and a wavelength at 718.00 to determine % Transmittance of the light and clarity or transparency of the wax products. The results were as follows:

| Material | % Transmittance |
|---|---|
| Deionized Water | 100 |
| (A) Composition of Example 2 | 66.2 |
| (B) 1$^{st}$ Competitor Product | 4.4 |
| (C) 2$^{nd}$ Competitor Product | 1.0 |
| (D) 3$^{rd}$ Competitor Product | 1.0 |

Turbidity (T) was defined as T=(Io−It)/Io where Io=Transmitted intensity of DI Water

| Material | Turbidity |
|---|---|
| (A) Composition of Example 2 | 0.34 |
| (B) 1$^{st}$ Competitor Product | 0.96 |
| (C) 2$^{nd}$ Competitor Product | 0.99 |
| (D) 3$^{rd}$ Competitor Product | 0.99 |

The high percent transmittance and low turbidity exhibited by the composition of the present invention results in a spray wax clear product having a transparent appearance.

Contact Angle

The cleaning and polishing wax composition of the present invention imparts a good degree of hydrophobicity to the waxed surface which traditionally consists of a metal, glass, plastic, or painted surface. As the hydrophobicity of the surface increases, the contact angles increase providing an indicator measuring the balling up of water droplets on the surface. Angles greater than 90 degrees are truly non-wetting. Advancing and receding angles were determined. The first trial results are reported as follows:

In accordance with a compositions of the present invention as set forth in the examples and the contact angle of water droplets were measured and the results recorded as shown in FIGS. 6-8.

Panels for each product were rinsed with mineral spirits to make sure there were no contaminants. The environment was controlled from 72 to 73° F. and from 58 to 60 percent humidity. The contact angle was measured to establish a baseline. The present invention (A) and the three competitive products (B), (C), and (E), were applied to respective pairs of panels according to the directions on the bottle. The panels were allowed to cure over the weekend and contact angles were measured for each. Each panel was washed five times. The contact angle was measured for each product, then the panels were again washed five times and the contact angle was measured again. The wash procedure was repeated until a selected number of washes were performed with contact angle data collected after each set of washings.

FIG. 6 is a graph showing a comparison of Water Droplet Contact Angle on Panels Treated with (A) the Composition of Example 2 of the present invention, (B) 1$^{st}$ Competitor Product, (C) 2$^{nd}$ Competitor's product and (E) a 4$^{th}$ Competitor's Product. The graph shows that contact angle of the reference was about 87. After waxing the contact angle for all of the panels increased; however, the contact angle for the composition of Example 2 was highest at about 115 decreasing after five washes to about 102 which is still greater than the competitor products at any time even immediately after waxing and before washing.

FIG. 7 is a graph showing another comparison of water droplet contact angle on panels treated with (A) the Composition of Example 2 of the present invention, (B) 1$^{st}$ Competitor Product and (E) a 4$^{th}$ Competitor's Product. The graph shows that contact angle of (A) being greater than both of the competitor's over a range of 5 washings.

FIG. 8 is a graph showing another comparison of water droplet contact angle on panels treated with (A) the Composition of Example 2 of the present invention. The graph shows that contact angle of (A) being effective even after 15 washings.

Modifications

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

Reference to documents made in the specification is intended to result in such patents or literature cited are expressly incorporated herein by reference, including any patents or other literature references cited within such documents as if fully set forth in this specification.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. A spray wax composition, comprising: zinc oxide having a mean particle size of 60 nanometers or less in an amount of from 0.001 to 3.0 percent by weight of the total composition;
   a silicone quat in an amount of from 0.1 to 25 percent by weight of the total composition;
   a microemulsion of a cationic camauba wax containing from 12 to 15 percent solids in an amount of 0.1 to 20 percent by weight of the total composition; and
   water in an amount from 75-95 percent by weight of the total composition.

2. The spray wax composition of claim 1, further comprising a fragrance in an amount of 0.2 percent by weight of the total composition.

3. The spray wax composition of claim 1, further comprising a preservative in an amount of 0.1 percent by weight of the total composition.

4. The spray wax composition of claim 1, wherein said silicone quat combines with said microemulsion of said cationic carnauba wax synergistically providing antistatic properties.

5. The spray wax composition of claim 1, wherein said silicone quat combines with said microemulsion of said cationic carnauba wax synergistically providing a low viscosity of from 150 to 500 cps at 25° C.

6. The spray wax composition of claim 1, wherein said silicon quat comprises a quaternary blend comprising long silicone chains having 70% active quaternary particles in a solvent solution.

7. The spray wax composition of claim 6, wherein said solution comprises 2-propanol, 1-butoxy.

8. The spray wax composition of claim 6, wherein said silicone quat comprises a quaternary blend in a solution containing 80% solids.

9. The composition of claim 1, wherein said silicon quat comprises a microemulsion non-ionic emulsion of a cationized amino-functional silicone polymer.

10. The composition of claim 1, wherein said silicone quat comprises silicone quaternium-16 and undeceth-11 and butyloctanol and undeceth-5.

11. The composition of claim 1, wherein said silicone quat comprises about 60 percent water and from 14 to 40 percent of methylamino siloxane with glycidyltrimethylammonium chloride, from 7 to 13 percent of alkyl polyethylene glycol, and from 3.0 to 7.0 percent 2-butyloctanol.

12. The composition of claim 1, wherein said silicone quat comprises particles below 200 nanometers.

13. The composition of claim 1, wherein said silicone quat comprises particles below 20 nanometers and appears transparent.

14. The composition of claim 1, wherein said silicon quat is present in an amount of from 1.0 to 15 percent by weight of the total composition.

15. The composition of claim 1, wherein said zinc oxide comprises a mean particle diameter of about 35 nanometers.

16. The composition of claim 1, wherein said zinc oxide comprises a mean particle diameter of from about 20 to 35 nanometers.

17. The composition of claim 1, wherein said zinc oxide comprises a mean particle diameter of from about 35 to 55 nanometers.

18. The composition of claim 1, wherein said zinc oxide comprises zinc oxide particles which are broad spectrum UV absorbers.

19. The composition of claim 1, wherein said zinc oxide comprises zinc oxide particles which have anti-bacterial properties.

20. The composition of claim 1, wherein said zinc oxide comprises zinc oxide particles which are mildew resistant.

21. The composition of claim 1, wherein said zinc oxide is present in an amount of up to 1.0 percent by weight of the total composition.

22. The composition of claim 1, wherein said zinc oxide is present in an amount of from 0.005 to 1.0 percent by weight based on the total weight of the composition.

23. The composition of claim 1, wherein said zinc oxide is present in an amount of from 0.01 to 1.0 percent by weight based on the total weight of the composition.

24. The composition of claim 1, wherein said zinc oxide is present in an amount of from 0.015 to 0.5 percent by weight based on the total weight of the composition.

25. The composition of claim 1, further comprising a preservative in an amount of up to 1 percent by weight of the total weight of the composition.

26. The composition of claim 25, wherein said preservative comprises a polymethoxybicyclic oxazolidine.

27. The composition of claim 25, wherein said preservative comprises 2-bromo-2-nitropropane-1,3-diol.

28. The composition of claim 1, further comprising a biocide in an amount of from 100 to 500 parts per million based on the weight of the total weight of the composition.

29. A spray wax composition consisting essentially of:
   zinc oxide having a mean particle size of 60 nanometers or less in an amount of from 0.001 to 3.0 percent by weight of the total composition;
   a silicone quat in an amount of from 0.1 to 25 percent by weight of the total composition;
   a microemulsion of a cationic carnauba wax containing from 12 to 15 percent solids in an amount of 0.1 to 20 percent by weight of the total composition; and
   water in an amount from 75-95 percent by weight of the total composition.

30. The spray wax composition of claim 29, further consisting essentially of a fragrance in an amount of about 0.2 percent by weight of the total composition.

31. The spray wax composition of claim 29, further consisting essentially of a preservative in an amount of about 0.1 percent by weight of the total composition.

32. The spray wax composition of claim 29, wherein said silicone quat combines with said microemulsion of said cationic carnauba wax synergistically providing antistatic properties.

33. The spray wax composition of claim 29, wherein said silicone quat combines with said microemulsion of said cationic carnauba wax synergistically providing a low viscosity of from 150 to 500 cps at 25° C.

34. The spray wax composition of claim 29, wherein said silicon quat comprises a quaternary blend comprising long silicone chains having 70% active quaternary particles in a solvent solution.

35. The spray wax composition of claim 34, wherein said solution comprises 2-propanol, 1-butoxy.

36. The spray wax composition of claim 34, wherein said silicone quat comprises a quaternary blend in a solution containing 80% solids.

37. The composition of claim 29, wherein said silicone quat comprises a microemulsion comprising a 25% non-ionic emulsion of a cationized amino-functional silicone polymer.

38. The composition of claim 29, wherein said silicone quat comprises a silicone quaternium-16 and undeceth-11 and butyloctanol and undeceth-5.

39. The composition of claim 29, wherein said silicon quat comprises about 60 percent water and from 14 to 40 percent of methylamino siloxane with glycidyltrimethylammonium chloride, from 7 to 13 percent of alkyl polyethylene glycol, and from 3.0 to 7.0 percent 2-butyloctanol.

40. The composition of claim 29, wherein said silicon quat comprises particles of 200 nanometers or less.

41. The composition of claim 29, wherein said silicone quat comprises particles of 20 nanometers or less.

42. The composition of claim 29, wherein said silicon quat is present in an amount of from 1.0 to 15 percent by weight of the total composition.

43. The composition of claim 29, wherein said zinc oxide comprises a mean particle diameter of about 35 nanometers.

44. The composition of claim 29, wherein said zinc oxide comprises a mean particle diameter of from about 20 to 35 nanometers.

45. The composition of claim 29, wherein said zinc oxide comprises a mean particle diameter of from about 35 to 55 nanometers.

46. The composition of claim 29, wherein said zinc oxide comprises zinc oxide particles which are broad spectrum UV absorbers.

47. The composition of claim 29, wherein said zinc oxide comprises zinc oxide particles which have anti-bacterial properties.

48. The composition of claim 29, wherein said zinc oxide comprises nanometer sized zinc oxide particles which are mildew resistant.

49. The composition of claim 29, wherein said zinc oxide is present in an amount of up to 1.0 percent by weight of the total composition.

50. The composition of claim 29, wherein said zinc oxide is present in an amount of from 0.005 to 1.0 percent by weight based on the total weight of the composition.

51. The composition of claim 29, wherein said zinc oxide is present in an amount of from 0.01 to 1.0 percent by weight based on the total weight of the composition.

52. The composition of claim 29, wherein said zinc oxide is present in an amount of from 0.015 to 0.5 percent by weight based on the total weight of the composition.

53. The composition of claim 29, further consisting essentially of a preservative in an amount of up to 1 percent by weight of the total weight of the composition.

54. The composition of claim 53, wherein said preservative comprises polymethoxybicyclic oxazolidine.

55. The composition of claim 53, wherein said preservative comprises 2-bromo-2-nitropropane-1,3-diol.

56. The composition of claim 29, further consisting essentially of a biocide in an amount of from 100 to 500 parts per million based on the weight of the total weight of the composition.

* * * * *